United States Patent
Taylor et al.

(10) Patent No.: US 7,455,217 B2
(45) Date of Patent: *Nov. 25, 2008

(54) APPARATUS AND METHOD OF COMMUNICATING WITH RFID TAGS

(75) Inventors: Peter S. Taylor, Solvang, CA (US); Ian Cullimore, Leominster (GB); Dean Wrench, Santa Barbara, CA (US)

(73) Assignee: BTS Technology, Inc., Goleta, CA (US)

( * ) Notice: Subject to any disclaimer, the term of this patent is extended or adjusted under 35 U.S.C. 154(b) by 451 days.

This patent is subject to a terminal disclaimer.

(21) Appl. No.: 11/000,549

(22) Filed: Nov. 30, 2004

(65) Prior Publication Data

US 2006/0113369 A1    Jun. 1, 2006

(51) Int. Cl.
*G06F 17/00* (2006.01)
(52) U.S. Cl. ............. 235/375; 235/472.01; 235/472.02; 235/485
(58) Field of Classification Search ................. 343/720; 235/375, 472.01, 472.02, 485
See application file for complete search history.

(56) References Cited

U.S. PATENT DOCUMENTS

| | | | | |
|---|---|---|---|---|
| 6,600,418 | B2* | 7/2003 | Francis et al. | 340/572.1 |
| 7,040,532 | B1* | 5/2006 | Taylor et al. | 235/375 |

* cited by examiner

*Primary Examiner*—Daniel A Hess
(74) *Attorney, Agent, or Firm*—Robert D. Atkins; Quarles & Brady LLP

(57) ABSTRACT

A hand-held RFID scanner has an extendable shaft with a handle for gripping of the RFID scanner. The shaft expands and retracts with a plurality of telescoping segments, either manually or with an electrical mechanism. An RFID antenna/reader is disposed on one end of the shaft. The RFID reader communicates with an RFID tag by RF communication link. A local controller, implemented as a PDA, is mounted to the extendable shaft and electrically connected to the RFID antenna/reader to receive data from the RFID tag. The local controller has an antenna for transmitting the data to a remote computer. The local controller executes software which allows the user to select whether the data is stored in the RFID tag or the remote computer. The software uses the RFID tag, RFID scanner with local controller, and remote computer to manage data associated with an object such as a wine barrel.

15 Claims, 10 Drawing Sheets

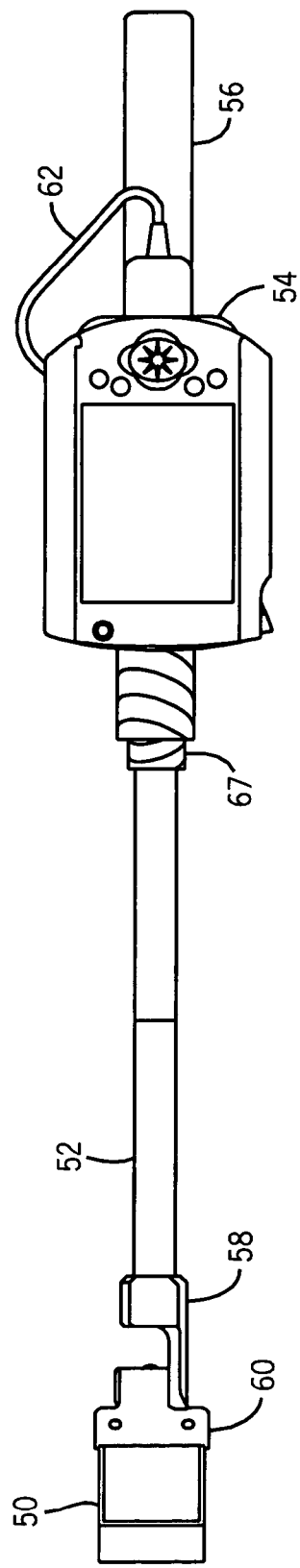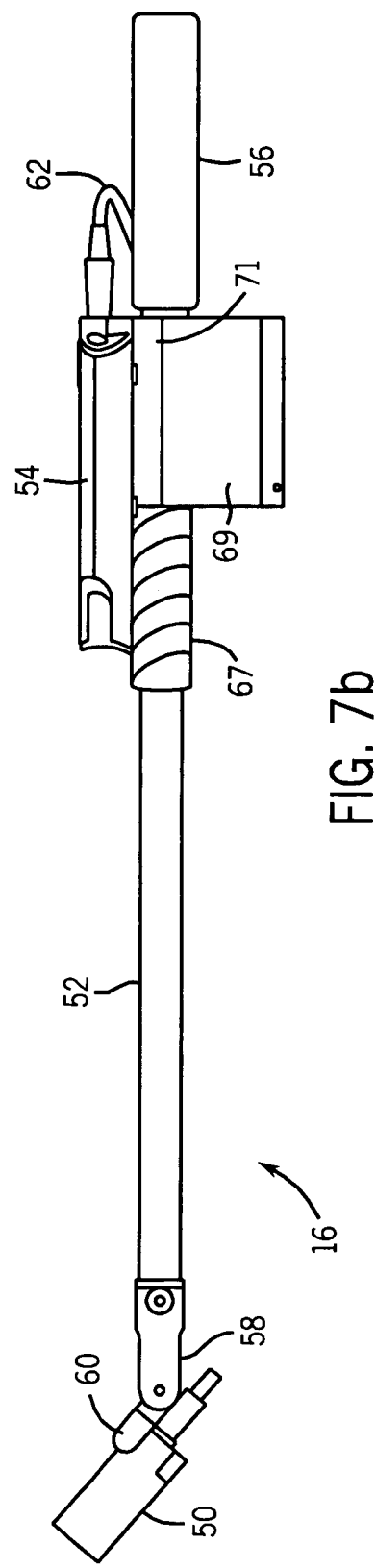
FIG. 7a
FIG. 7b

APPARATUS AND METHOD OF COMMUNICATING WITH RFID TAGS

CROSS REFERENCE TO RELATED PATENT APPLICATIONS

The present patent application is related to copending U.S. patent application Ser. No. 11/000,796, entitled "System and Method of RFID Data Tracking in Winemaking Process" and filed concurrently herewith by Peter S. Taylor et al. The present patent application is further related to U.S. patent application Ser. No. 11/000,808, now U.S. Pat. No. 7,040,532, entitled "System and Method of RFID Data Tracking" and filed concurrently herewith by Peter S. Taylor et al.

FIELD OF THE INVENTION

The present invention relates in general to radio frequency identification (RFID) devices and, more particularly, to an apparatus and method of communicating with RFID tags.

BACKGROUND OF THE INVENTION

Radio frequency identification (RFID) technology is increasingly being used to manage the ever-growing amount of information in today's world. In RFID technology, devices called "tags" include an integrated circuit (IC) connected to an antenna. The RFID IC contains memory to store data. An RFID reader or antenna communicates with the tag using an RF signal. Data can be written to and read from the tags. The tags respond to the interrogating RF signal from the RFID reader to retrieve the information stored in their memory, e.g., simple object identification data.

In a typical RFID system, the RFID tag is placed on a moveable or fixed object or item. Certain data or information associated with the item is stored in the tag. When it is necessary to communicate with the tag, the RFID reader sends a request by RF communication link to the RFID tag to access the data. The tag, in turn, responds with the requested data back to the reader. The RFID reader typically has on-board data processing capability for handling the requested data.

Traditionally, the RFID system has a fixed reader integrated with data processing equipment for managing the RFID information. Such systems lack the necessary mobility to read, transfer, and store RFID information in dynamic or unconventional environments. The RFID system also lacks real-time data management capability. The physical limitations inherent in the RFID tag as embedded in an object may prevent many current systems from effectively reading, transferring, or storing information.

In one example, the winemaking industry has a need to track data relating to barrels of wine through the winemaking process. While wine is aging in barrels, there is constant activity involved in monitoring, processing, and maintaining the quality of the wine. The winemaking activities include winemaker tasting, recording notes, chemical analysis, topping, and tracking the various factors that affect the final taste and quality of the wine.

In most, if not all cases, the winemaking industry presently uses pre-printed barcode labels as a standard means of identifying and tracking data associated with the winemaking process. Alternatively, the winemaking data is hand written on the side or end of the barrel. The record keeping process is labor intensive, prone to error, and the labels themselves can easily be dislodged, damaged, or destroyed. The barcode labels do not provide sufficient data capacity or density to adequately track all necessary information and parameters associated with the winemaking process.

The winemaking industry presents a particular problem for current record keeping technologies. The space in wine cellars is a premium, and most cellars feature wine barrels in a stacked arrangement, from one or two barrels deep and four to six barrels high. Many of the barrels are difficult to reach and cannot easily be moved. Consequently, traditional record keeping techniques are difficult and ineffective in accessing the stacked wine barrels.

A need exists for a flexible, configurable approach to reading, transferring, and storing RFID process data in the winemaking industry.

SUMMARY OF THE INVENTION

In one embodiment, the present invention is a hand-held radio frequency identification (RFID) scanner for tracking data comprising an extendable shaft having a handle for gripping the hand-held RFID scanner. An RFID reader is disposed on a first end of the extendable shaft. A local controller is mounted to the extendable shaft. The local controller receives data from the RFID reader. An antenna communicates with the local controller for transmitting the data externally.

In another embodiment, the present invention is a method of making a radio frequency identification (RFID) scanner comprising providing an extendable shaft for structural support, disposing an RFID reader on a first end of the extendable shaft, and mounting a local controller to the extendable shaft for receiving data from the RFID reader.

In another embodiment, the present invention is a frequency identification (RFID) system for tracking data comprising a hand-held scanner including an extendable shaft having a handle for gripping the hand-held RFID scanner, an RFID reader disposed on the extendable shaft, and a local controller mounted to the extendable shaft and receiving data from the RFID reader. An RFID tag is adapted for communicating with the RFID reader.

In another embodiment, the present invention is a radio frequency identification (RFID) scanner comprising a shaft for providing structural support. An RFID reader is disposed on the shaft. A local controller is mechanically mounted to the shaft and electrically coupled to the RFID reader.

BRIEF DESCRIPTION OF THE DRAWINGS

FIG. 7a is a top view of the hand-held RFID scanner;

FIG. 7b is a side view of the hand-held RFID scanner;

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
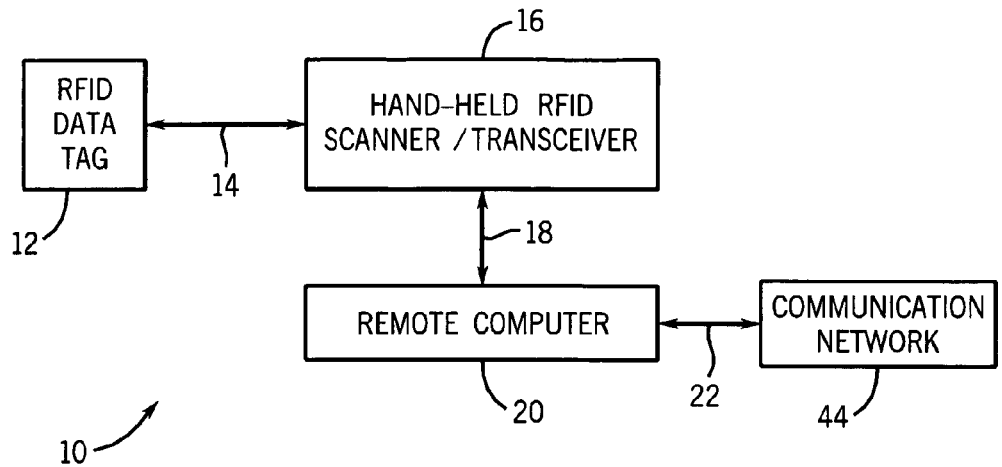
FIG. 1 is a block diagram of a system of RFID data tracking.

Referring to FIG. 1, an RFID data tracking system 10 is shown. An RFID data tag 12 is shown suitable for affixing to a movable or fixed product or object. In one embodiment, the object may be a wine barrel, vessel, or container. In other embodiments, the product or object can be manufacturing work-in-process, manufacturing equipment, retail merchandise, and other articles or goods. RFID data tag 12 may contain inventory information about the object, such as historical data, manufacturing data, testing data, analysis data, shipping information, or sales information. The information is written to physical electronic memory, which is located on RFID tag 12. The electronic memory may take the form of EEPROM, EPROM, and other nonvolatile memory. RF communication link 14 is shown connecting tag 12 with a hand-held RFID scanner 16. Tag 12 has the ability to send or receive information over communication link 14. Communication link 14 follows a standard radio frequency identification (RFID) communication protocol. Tag 12 receives updated information from RFID scanner 16, such as updated manufacturing information or new location of the product.

Hand-held RFID scanner 16 operates to send information to and receive information from tag 12 over RF communication link 14. RFID scanner 16 also operates to send information to and receive information from remote computer 20 over communication link 18. Communications link 18 may use any communications protocol, wired or wireless, that allows RFID scanner 16 to communicate with computer 20. In one example, the communication protocol between RFID scanner 16 and computer 20 is the IEEE 802.11b wireless protocol operating at 2.4 GHz frequency. Remote computer 20 is also connected to communication network 44 through communication link 22, which allows remote computer 20 to send and receive information to and from external resources. In one example, communication link 22 is an Ethernet connection, and communication network 44 is the Internet.

Figure 2:
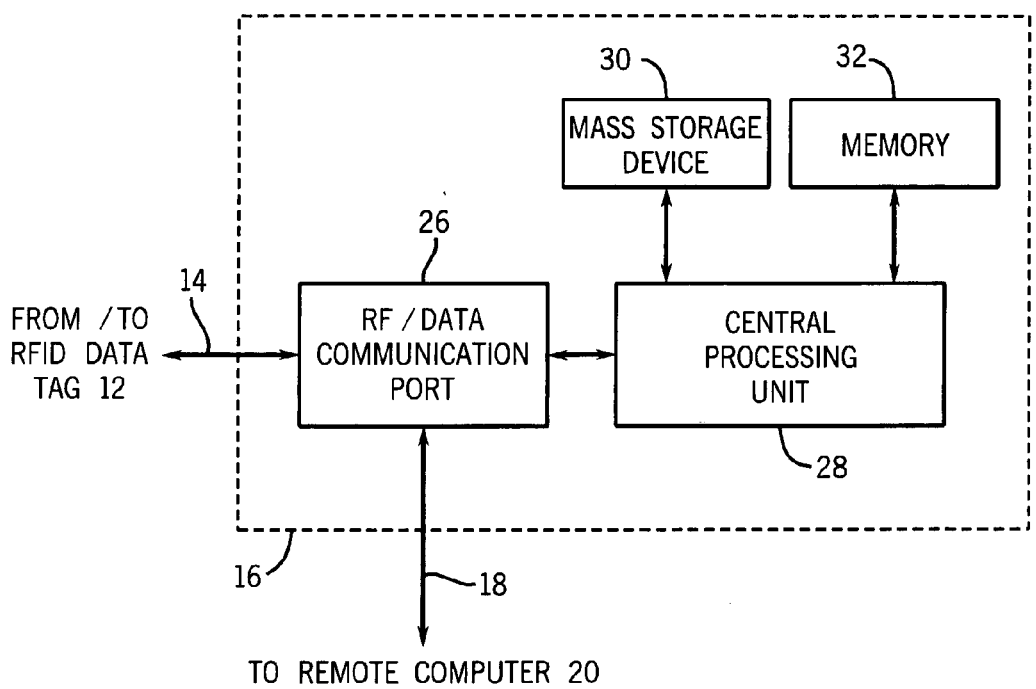
FIG. 2 is a block diagram of a local controller of a hand-held RFID scanner.

Referring to FIG. 2, a general block diagram of RFID scanner 16 is shown. RFID scanner 16 includes RF/data communication port 26; one port providing RF communication and another port providing data communications. The RF port has an antenna for communicating over RF communication link 14 with RFID data tag 12. The data port is connected through communication link 18 for sending and receiving data to and from remote computer 20.

RFID scanner 16 also has central processing unit (CPU) or microprocessor 28 in communication with RF/data communication port 26. A data and instruction bus from CPU 28 is connected to mass storage device 30 and electronic memory 32. To read data from RFID tag 12, an RF read signal is transmitted over communication link 14 to activate RFID tag 12. RFID tag 12 retrieves the requested information from its memory and sends the data back over communication link 14 to communication port 26. In a simple example, RFID scanner 16 polls RFID tag 12 to get its identification number. The RF read signal requesting the item identification is sent to RFID tag 12 by way of communications link 14 using the standard RFID communications protocol. RFID tag 12 retrieves the item identification from its memory and transmits the data back to RFID scanner 16. The item identification data is sent to CPU 28 and locally stored in mass storage device 30 or electronic memory 32 for further processing. The item identifier can also be sent to remote computer 20 through communication link 18.

To write to RFID tag 12, an RF write signal, including data, is transmitted over communication link 14 to RFID tag 12. RFID tag 12 receives the RF write signal and stores the enclosed data in its memory. From the above example, the write data signal may include a date of last identifier query. The RF write signal, with date of last query data, is sent to RFID tag 12. The RF write signal causes the data to be stored in the tag's memory.

RFID scanner 16 includes a computer program or application software executing on CPU 28 to enable the scanner to do the programming functions associated with sending and receiving data, storing data, and performing information processing. For example, RFID scanner 16 uses the item identifier to retrieve information related to such item identifier stored in memory 32. The RFID scanner also allows the user to update the information related to the item identifier, and then saves the updated information back into memory 32 or forwards the same information to remote computer 20 through communication link 18.

Figure 3:
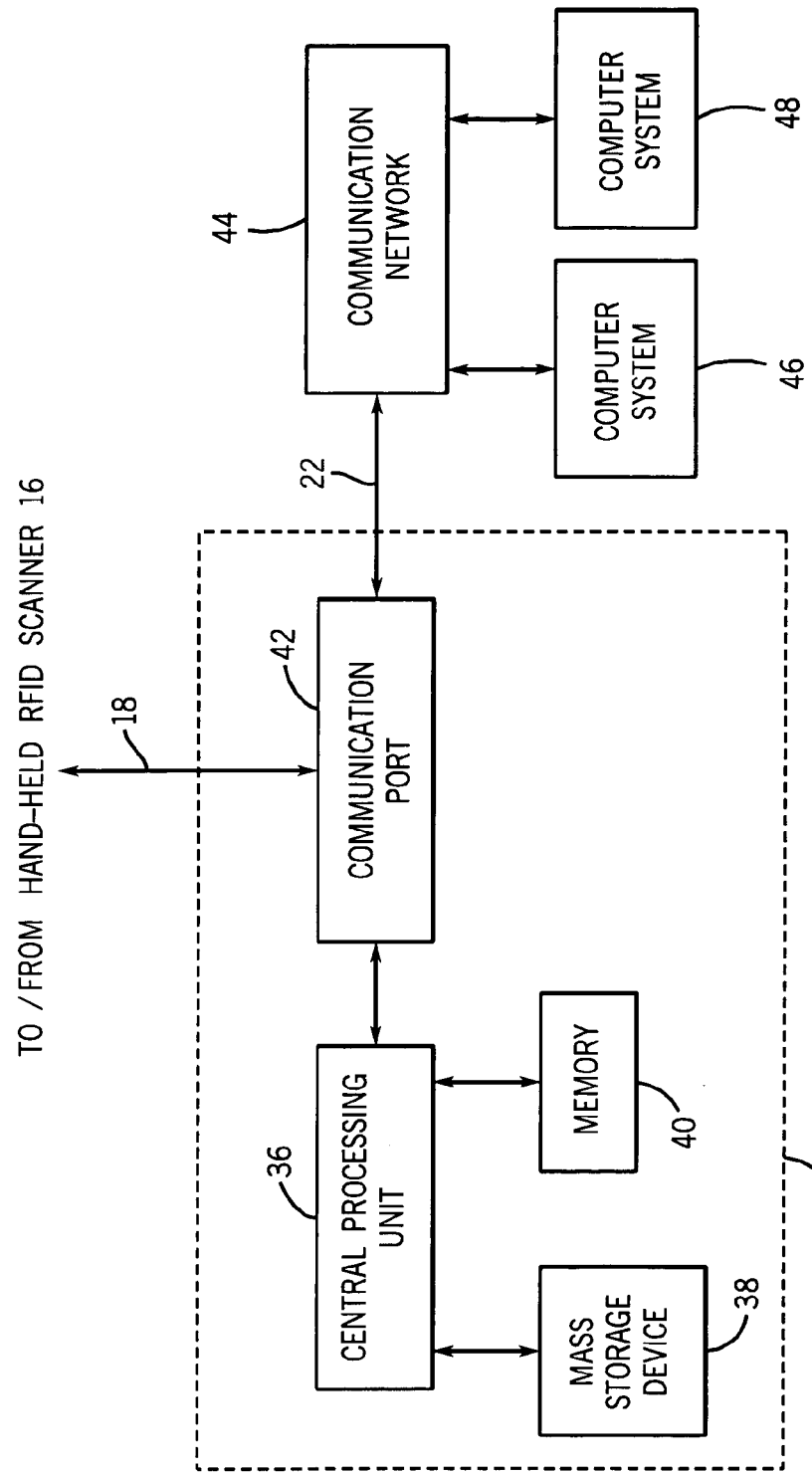
FIG. 3 is a block diagram of a remote computer of an RFID data tracking system.

Referring now to FIG. 3, a general purpose computer system is illustrated as remote computer 20 including CPU or microprocessor 36, mass storage device or hard disk 38, electronic memory 40, and communication port 42. Communication port 22 is a high-speed Ethernet connection to communication network 44. Communication network 44 is an open architecture system such as the world wide web, commonly known as the Internet. Computer system 46 and computer system 48 are also connected to communication network 44, which allows for communication between computer systems 46 and 48, and remote computer 20.

Computer 20 includes computer programs or application software to enable it to interact directly with RFID scanner 16 and indirectly with RFID tag 12. For example, software on computer 20 directs incoming information from communication link 18 through communication port 42 and into microprocessor 36. The incoming information is processed through microprocessor 36 and saved to mass storage device 38 or electronic memory 40. The incoming information can be processed through microprocessor 36, through communication port 42, and further through communication link 22 to communication network 44 and the outside world.

Computer 20 works in conjunction with RFID scanner 16 to organize, route, or process information. The incoming information from RFID data tag 12 causes the software operating on RFID scanner 16 to access a particular portion of its onboard mass storage device 30 or memory 32 to look for related information. For example, a car tire RFID data tag may contain certain manufacturing information, such as its date of manufacture. The date of manufacturing information is entered into RFID scanner 16 through communication port 42, and causes microprocessor 36 to search its mass storage device 38 or electronic memory 40 for additional information related to the date of manufacture information, such as location of inventory, manufacturer name, or other information. RFID scanner 16 utilizes communication port 36 to communicate through communication link 18 to remote computer 20. RFID scanner 16 may request information from remote computer 20 regarding date of manufacturing information for the scanned car tire. In turn, remote computer 20 searches its own respective mass storage device 38, for example, by querying a database which is stored on mass storage device 38. Remote computer 20, in turn, requests information from another computer system located in the outside world through communication network 44, such as a request for additional tire data to associate with the particular data being received from RFID scanner 16.

The information exchange and sharing arrangement between RFID data tag 12, RFID scanner 16, remote computer 20, and through communication network 44 to computer systems 46 and 48, can provide a multiplicity of benefits. For example, a car maker is able to track its own inventory of car tires, and, in real-time, be able to request inventory from a manufacturer or another source to match the output of a respective factory. RFID data tracking with shared information and resources is a powerful business tool.

Figure 4:
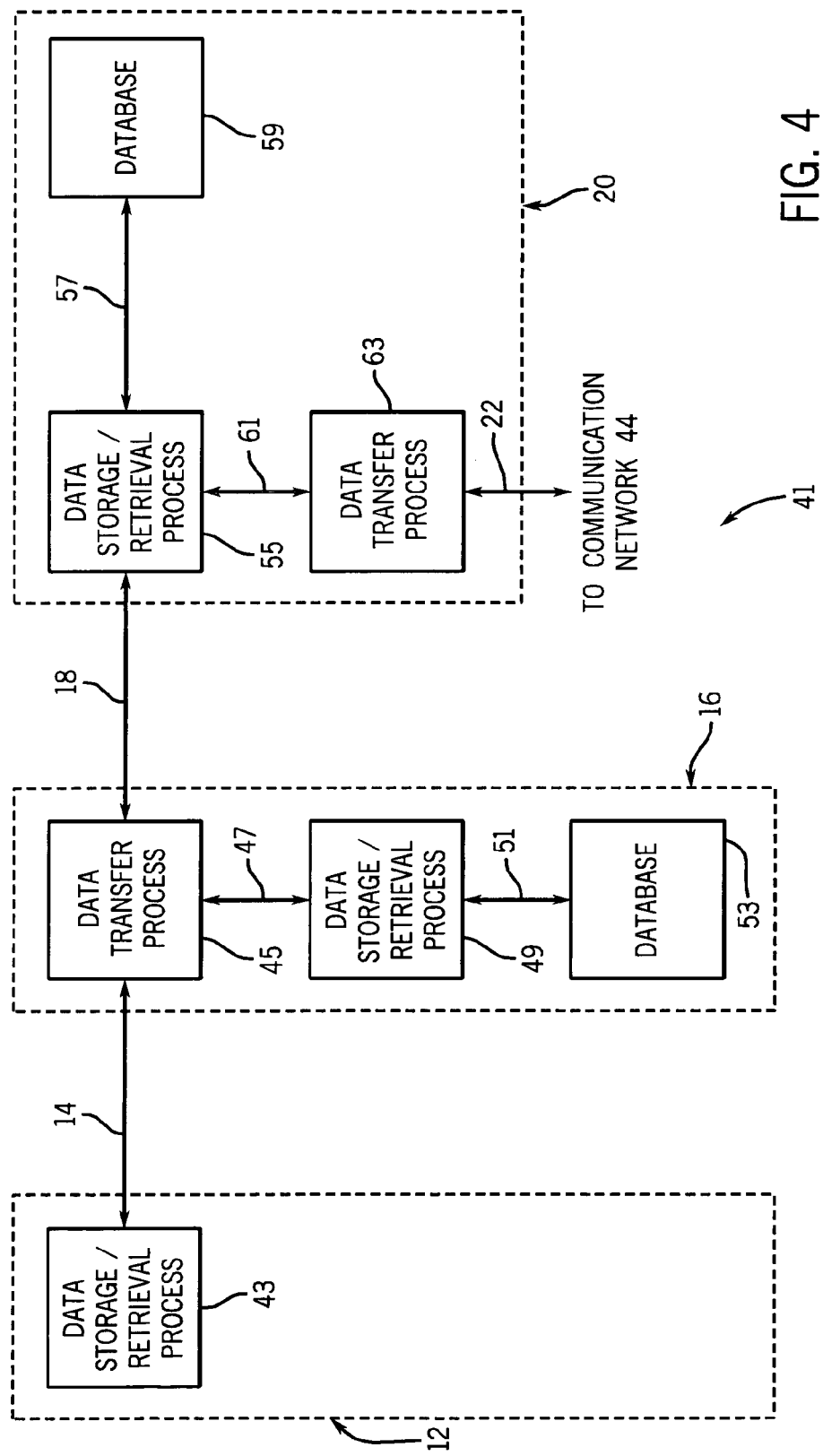
FIG. 4 illustrates a data flow process in the RFID data tracking system.

In FIG. 4, a block diagram of an exemplary data flow process 41 of the RFID data tracking is shown. RFID data tag 12 is depicted with an associated data storage/retrieval process 43. RFID data tag 12 receives data through communication link 14, and sends information through communication link 14. The received information undergoes a data storage process 43 to store information on RFID data tag 12. The sent information undergoes a data retrieval process 43 to retrieve information from RFID data tag 12.

Adjacent to RFID data tag 12, RFID scanner 16 is shown. RFID scanner 16 receives and sends information to RFID data tag 12 through communication link 14. Once information has been entered into RFID scanner 16, the information undergoes an internal data transfer process 45. The data can be routed in one of two ways: it may be routed externally again through communication link 18, or it may be routed through communication link 47 to undergo an internal data storage/retrieval process 49. The communication link 51 is used to query an internal database 53 located on RFID scanner 16. The data undergoes an internal data storage process 49 using communication link 51 to save the data to internal database 53. Alternatively, the data undergoes an internal data retrieval process 49 using communication link 51 to retrieve the data from internal database 53.

If data is routed externally through communication link 18, the data is entered into remote computer 20. Remote computer 20 takes data from an external source and processes the data through its own internal data storage/retrieval process 55. The data can be sent through communication link 57 to be written on an internal database 59. Remote computer 20 can query internal database 59 for information to be retrieved through data retrieval process 55.

Remote computer 20 uses communication link 61 to cause data to undergo another data transfer process 63 where the data is prepared to route to an external destination using communication link 22 to communication network 44. Remote computer 20 receives external information from communication network 44 using communication link 22.

RFID scanner 16 requests and receives data from RFID data tag 12 using associated data transfer, storage, and retrieval processes. Using the respective data, RFID scanner 16 queries the database located on remote computer 20 also using associated data transfer, storage, and retrieval processes. RFID scanner 16 associates the data requested and received from RFID data tag 12 with the data requested and received from remote computer 20. The associated data can be displayed on a GUI screen located on RFID scanner 16. A user makes use of the GUI and associated software running on RFID scanner 16 to manipulate and manage the data. The data can be routed to any number of internal or external destinations where the data is saved.

In one embodiment of RFID data tracking system 10, data is stored completely on RFID data tag 12. Alternatively, the data can be partially stored on RFID data tag 12 and partially stored on RFID scanner 16, e.g., within internal database 53. The data can also be partially or completely stored on remote computer 20, e.g., within an internal database 59. The user selects which portion of the data is stored on RFID tag 12, which portion is the data is stored on RFID scanner 16, and which portion of the data is stored on remote computer 20. Any number of data storing possibilities involving RFID data tag 12, RFID scanner 16, remote computer 20, and computer system 46 can be realized.

The software operating on RFID scanner 16 and remote computer 20 may be provided as a series of computer instructions on floppy or CD medium, or downloaded from the vendor's or developer's website.

Figure 5:
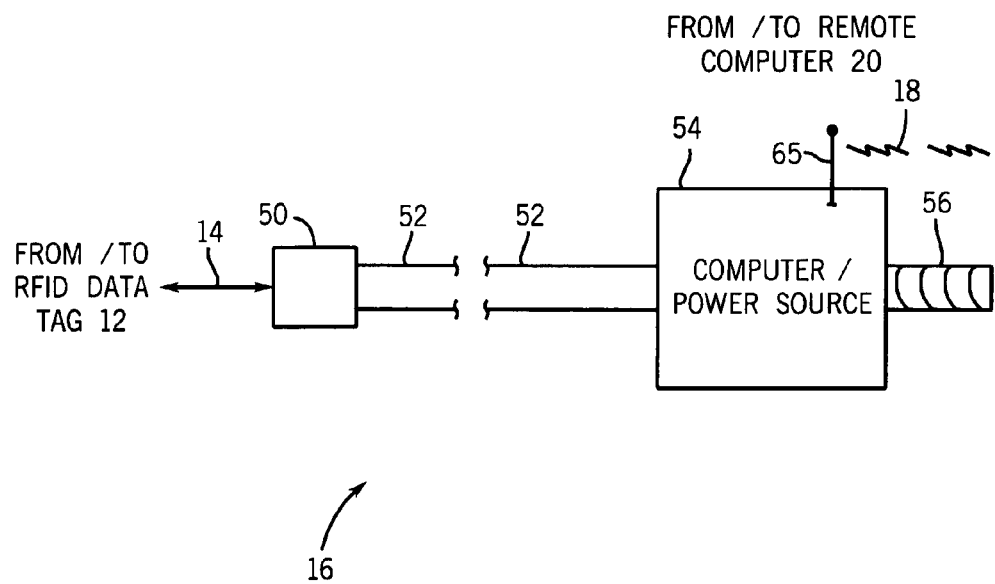
FIG. 5 illustrates an embodiment of the hand-held RFID scanner.

Referring now to FIG. 5, further detail of RFID scanner 16 is shown as having RFID antenna/reader 50, extendable shaft 52, computer and power source 54, and handle 56. The handle 56 is connected to extendable shaft 52. Handle 56 has an ergonomic grip, which allows RFID scanner 16 to be handheld. Computer and power source 54 can be implemented as a personal digital assistant (PDA). The PDA is firmly attached to handle 56 or shaft 52 with a sleeve or slide mount. PDA 54 includes an antenna 65 for wireless communication with remote computer 20 via communication link 18. RFID antenna/reader 50 is affixed to one end of extendable shaft 52. RFID reader 50 has an antenna for both read and write capability with RFID tag 12 using the RFID communication protocol. Shaft 52 is adjustable in length. The shaft can be lengthened for reaching objects that are out of reach in order to get RFID reader 50 in communication proximity of RFID tag 12. The shaft can be shortened for an application where it is not necessary to utilize the extended reach of RFID scanner 16, for example, for use in scanning one or more objects located a head-level or below.

Extendable shaft 52 can be extended or elongated for specialized applications where an extended reach of RFID reader 50 is desired to bring the antenna within range of RFID data tag 12. RFID data tag 12 typically has low signal transmission power and corresponding limited transmission range. Accordingly, the RFID reader 50 must be brought into proximity to RFID tag 12 for reliable communications to take place. In cases where the object is initially out of range of the RF signal, i.e. with RFID scanner 16 in its minimal length configuration while the object is atop a vertical stack of boxes of inventory, shaft 52 can be extended to bring RFID reader 50 in communication range to allow for reliable RFID data transfer. The RFID reader 50 can be separated from local controller 54 by an appreciable distance using extendable shaft 52. For example, the user can extend shaft 50 by several feet to reach a row of boxes which lies on a high shelf or rack.

Extendable shaft 52 is mated with or mounted to local controller or PDA 54. The incoming/outgoing RFID signal 14 enters RFID reader 50 where it is converted from a radio signal into an electrical signal and routed by electrical conductor through shaft 52 to PDA 54. The PDA receives the electrical signal and performs processing as described below. PDA 54 has a local power source, such as a rechargeable lithium-ion battery, for mobile operation.

Figure 6:
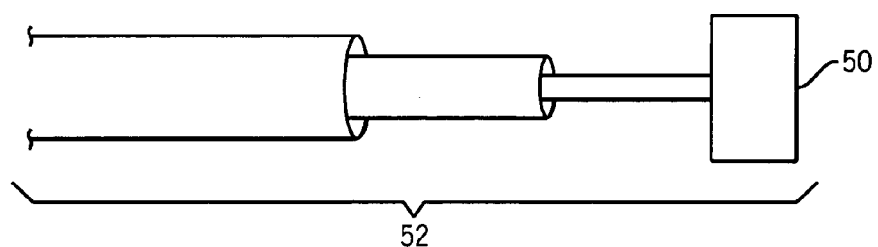
FIG. 6 illustrates an extendable shaft of the hand-held RFID scanner.

Turning to FIG. 6, an embodiment of extendable shaft 52 is shown. Again, RFID reader 50 is shown connected to a plurality of segments of shaft 52. In one embodiment, extendable shaft 52 is segmented or telescoping, where one particular segment of the shaft is inserted into a following segment. To extend the shaft, the user simply pulls on the trailing end of the shaft, drawing out each following telescoping segment.

In another embodiment, shaft 52 uses electrical or hydraulic mechanism to extend or shorten each segment of the shaft. For specialized applications, shaft 52 is made with a plurality of segments, each having a fixed-length. The segments are extendable so the shaft varies in length, from a few centimeters to several meters. The shaft 52 may have a hinged mechanism to allow flexibility in positioning RFID reader 50.

Referring to FIG. 7a, a top view of RFID scanner 16 is shown. RFID reader 50 is connected to RFID reader bracket 60 and swivel bracket 58. Swivel bracket 58 couples shaft 52 with RFID reader 50 and respective bracket 60. Swivel bracket 58 allows RFID reader 50 to pivot to a particular angle, again to facilitate the reach to areas that are limited in accessibility. Bracket 58 also allows RFID reader 50 to rotate clockwise or counterclockwise to provide flexibility for a specific application.

As shown in FIG. 7a, extendable shaft 52 may use telescoping segments 67 to enable the shaft to be extended and retracted to suit a particular need. Alternatively, RFID scanner 16 may use electrical or hydraulic mechanisms to extend or retract of the shaft.

PDA 54 is shown affixed to shaft 52 and telescoping segments 67. The PDA uses a protective sleeve or slide mount to mount to shaft 52. PDA 54 has the ability to perform information management of the RFID data and other related tasks. In another embodiment, local controller 54 may be a laptop computer, notepad computer, or other integrated computing component.

RFID reader 50 connects to PDA 54 by way of communication link 62 to facilitate the connection of the PDA to the other components of RFID scanner 16. Again, RFID reader 50 converts RFID signals to an electrical format, which are routed by way of communication link 62 through shaft 52 to PDA 54. An interface module processes the electrical communication between RFID reader 50 and PDA 54. The ergonomic grip or handle 56 is shown to facilitate holding RFID scanner 16 by the user's right hand or left hand.

Turning now to FIG. 7b, a side-view of RFID scanner 16 is shown. RFID reader 50 is shown connected to RFID reader bracket 60 and swivel bracket 58. Swivel bracket 58 is shown connected to shaft 52 with telescoping segments 67. PDA 54 is connected by communications link 62 to RFID reader 50. Extendable shaft 52 with telescoping segments 67 is shown, as is grip 56. FIG. 7b illustrates power source 69 disposed adjacent to PDA 54. The power source 69 uses a rechargeable battery or array of batteries. PDA 54 utilizes the onboard batteries of the PDA to send, store, or receive information. Similarly, internal batteries of a notebook or other portable computer can be used. The power source 69 features a battery enclosure that is mounted to shaft 52. RFID scanner 16 utilizes the enclosure to contain the removable, rechargeable battery for PDA 54. The power source has a power-management hardware subsystem that serves to regulate and control the delivery of power from the power source 69 to PDA 54. The interface module 71 provides the electrical interface between RFID reader 50 and PDA 54. In an alternate embodiment, the power supply 69 and interface module 71 may be integrated onto a single printed circuit board.

In one embodiment, PDA 54 is made with an overmolded compound using a durable material such as a plastic or polycarbonate material. PDA 54 is enclosed by the overmolding, as may be grip 56. Alternatively, the overmolding encompasses PDA 54, grip 56, and partially or completely encompass shaft 52. The overmolding increases strength of RFID scanner 16, provides ergonomic benefits, and enhances durability.

Figure 8:
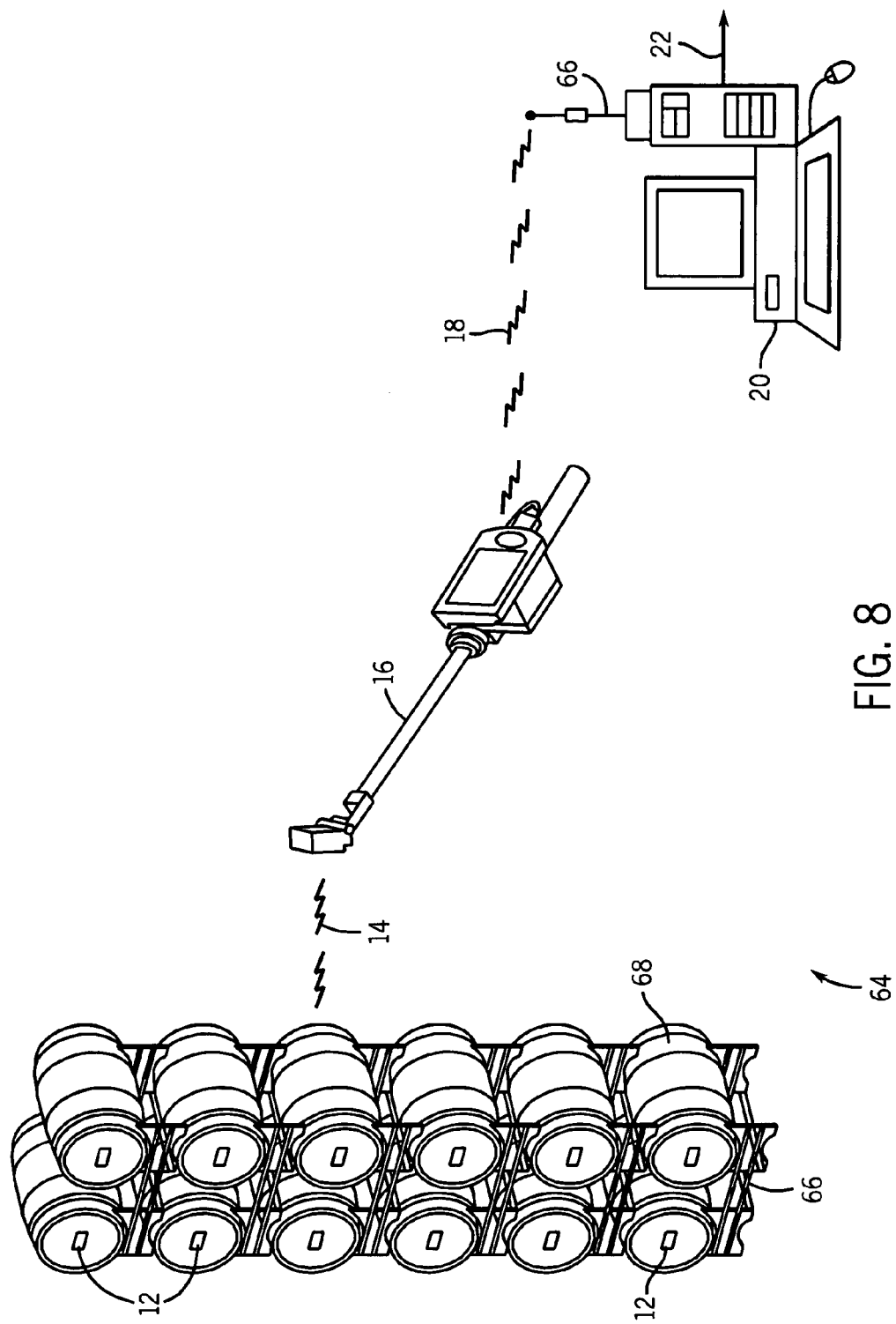
FIG. 8 illustrates an RFID data tracking system for use in the winemaking industry.

Turning now to FIG. 8, RFID data tracking system 10 is shown. In the winemaking industry, wine barrels are stored on top of each other in a series of racks. The storage racks are generally located in a warehouse, cellar, or other similar storage area. Winemaking RFID data tracking system 64 depicts wine barrel racks 66 and wine barrels 68 stacked two barrels wide by six barrels high. Wine barrel racks 66 are stacked on top of each other as shown.

Typically, the winemaking industry uses welded steel in wine barrel rack 66. Depending on the configuration, wine barrel rack 66 holds either two or four 60-gallon oak wine barrels. The rack-barrel combinations are carried by forklifts and placed in vertical stacks up to six barrels high, approximately 18.5 ft. tall. The wine industry uses wine barrel racks 66 for two main reasons: (1) wine barrel rack 66 provides easy access to the barrels for topping and maintenance, and (2) wine barrel rack 66 provides the best available alternative for high-density storage of wine barrels. Each barrel weighs about 600 pounds and is worth approximately $600. The value of a filled barrel is approximately $3000. Many cellars in California contain between 40,000 and 60,000 wine barrels arranged in this fashion.

Each wine barrel 68 has an RFID tag 12 attached to the end or side of the barrel. The tag can be attached by adhesive, screws, insert, tacks, or other securing mechanism. The RFID tag 12 can be recessed into a groove or cut-out in the wood to minimize damage to the tag should the barrel be bumped or impacted. The RFID tag 12 contains information related to the barrel to which the tag is attached.

Notice that some barrels 68 are relatively high and out of reach of most workers. It is impractical to move wine barrels down from the rack for the sole purpose of reading the RFID tag. By utilizing RFID scanner 16 having extendable shaft 52, the winemakers can use the scanner to extend the practical range of reading from and writing to RFID data tag 12. For example, the winemaker can use the extended shaft 52 to reach RFID data tags 12 that are located on barrels placed high on the racks. The design of RFID scanner 16 allows the user to place the scanner in a region that might not be as easily accessible, such as near the end of wine barrel 68 located high on wine barrel rack 66.

While wine is aging in barrels, there is constant activity involved in monitoring, processing, and maintaining the quality of the wine. The maintenance activities include winemaker tasting and recording notes, chemical analysis, topping, and tracking the various factors that affect the final taste and quality of the wine.

The industry presently uses pre-printed barcode labels as a standard means of identifying and tracking winemaking related data. The record keeping process is labor intensive, prone to error, and the labels can easily be damaged or destroyed. The barcode labels do not provide enough data capacity or density to adequately track all necessary parameters. One of the main drawbacks of barcode systems is the limited data that can be represented with an alphanumeric string. It is difficult to change the barcode should the barrel data change. Other common problem areas include misprinted or out-of-date barcode labels, and barcode labels that have placed on the wrong barrels.

Winemaking RFID data tracking system 64 addresses many of the problems by permanently attaching RFID data tag 12 to barrel 68. In one embodiment, RFID data tag 12 holds 240 16-bit words. In other embodiments, the RFID tag will contain significantly more memory capacity, e.g. kilobits and megabits of electronic memory. Through encryption and data coding, the weekly/monthly/annual process transactions and history of the barrel can be contained on RFID data tag 12 and locally viewed on RFID scanner 16.

Winemaking RFID data tracking system 64 gives the winemaker far greater process control and supporting data to constantly monitor and improve the quality of the wine. As barrels are moved and used in subsequent years, data is maintained on a personal computer or server and/or on the RFID tag on the barrel. Data maintenance on a personal computer or server, or at the barrel eliminates the confusing and labor-intensive task of trying to track a barrel's location, age, ownership, flavor profile, and other critical characteristics.

As a first consideration in winemaking RFID data tracking system 64, the user selects what portion of the overall data associated with winemaking is to be stored on RFID tag 12, what portion of the data is to be stored on local controller 54, and what portion of the data is to be stored on remove computer 20. RFID scanner 16 has the ability to read a portion of the data from RFID tag 12 and a portion of the data from remote computer 20. RFID scanner 16 manages the data from each source as described below, e.g. by making changes to the data based on recent tests, analysis, and events in the winemaking process on a per barrel basis. The data is then written back to the RFID tag, local controller, and/or remote computer.

Referring again to FIGS. 7a-7b, winemaking RFID data tracking system 64 operates by first affixing an RFID data tag 12 to each wine barrel 68. The RFID data tags are typically rectangular or circular in form and about the surface area of a quarter. RFID data tag 12 has a sealed polymer shell, and is resistant to shock, heat/cold, and moisture. RFID tag 12 is mounted to the end of wine barrel 68 using a food-grade adhesive. Besides offering the advantage of read/write capability, RFID technology does not require a line-of-sight to transfer data. In addition, RFID reader and tags can be effective in harsh environments where traditional record keeping methods fail.

As an alternative to simply affixing RFID data tag 12 on the end of wine barrel 68, several methods can be utilized that increase the physical security of RFID data tag 12 used on wooden wine barrels. One such method involves machining a recess into the wood barrel staves as a receptacle for the adhesive and tag, making tag removal more difficult. An alternative method involves embedding RFID tag 12 in or between barrel staves during barrel manufacturing, and providing associated unique identifying markings on the outside of the barrel indicating the appropriate scan area. For example, the tag area may be marked with a colored perimeter.

RFID data tags 12 can also be affixed for tracking wine stored in metal or plastic barrels. The RFID tags used on metal barrels require a small plastic spacer between the barrel and the tag for RF isolation.

As a next step in winemaking RFID data tracking system 64, RFID scanner 16 communicates with RFID tag 12 via communication link 14. RFID scanner 16 uses its onboard software to first activate and initialize RFID data tag 12. In one example, RFID data tag 12 is given preliminary data about the wine that will be stored in the barrel, such as simply an I.D. number. The I.D. number will be received by RFID data tag 12 and stored on the tag to be read at a later date. The onboard software on RFID scanner 16 provides the primary user interface for local controller 54, such as the PDA, and the remaining components of RFID scanner 16.

Winemaking RFID data tracking system 64 also utilizes RFID scanner 16 to communicate with remote computer 20 via communications link 18. Remote computer 20 is connected to wireless access point 66, which serves to receive incoming wireless data and send outgoing wireless data, such as data sent/received on an IEEE 802.11b wireless protocol.

Winemaking RFID data tracking system 64 provides real-time database access by the use of wireless data communication. Wireless communication uses a wireless local area network (LAN) such as Wi-Fi or its equivalent, or a wide area network (WAN) such as WiMAX, a wireless protocol such as GSM/GPRS, or even another wireless protocol such as CDMA/1xRTT, or EV-DO or its equivalent.

RFID data tracking system 10 includes a process by which the data on each RFID data tag 12 is stored in a data structure that is unique to the data tracking system. The preprogrammed data is also provided to RFID data tag 12, such as vendor identification information. In the winemaking industry, the preprogrammed data includes the following wine barrel characteristics data: manufacturer data, type and source of wood data, toasting characteristics and stave configuration data, date of manufacture information, testing, analysis, and service date information.

When writing data to or reading data from RFID data tag 12, winemaking RFID data tracking system 64 optionally encrypts the communication path to ensure the security and integrity of the respective communications transmission. The encryption occurs through any of the previously mentioned communications links or data flow processes. Optional authentication software can ensure that tag reading and writing is being accomplished by authorized RFID scanners 16 and by authorized users of scanners 16 for an authorized service or application.

Referring again to FIG. 8, remote computer 20 has another communication link 22 which connects it to the outside world. Remote computer 20 functions to store or retrieve information from a database, located physically at computer 20 or elsewhere in a connected network. Remote computer 20 performs computing or other information management functions that cannot be performed locally on RFID scanner 16 due to physical constraints such as memory or power limitations.

As an illustration of winemaking RFID data tracking system 64, assume the winemaker wishes to utilize RFID data tracking system 64 to perform RFID wine process data tracking transaction A. The winemaker first initializes an RFID data tag 12 for use in the wine cellar. The winemaker reads and reviews data from an existing RFID data tag 12, or updates and writes new data to an existing RFID data tag 12. Exemplary RFID tracking transaction A will describe these processes in greater detail.

Figure 9:
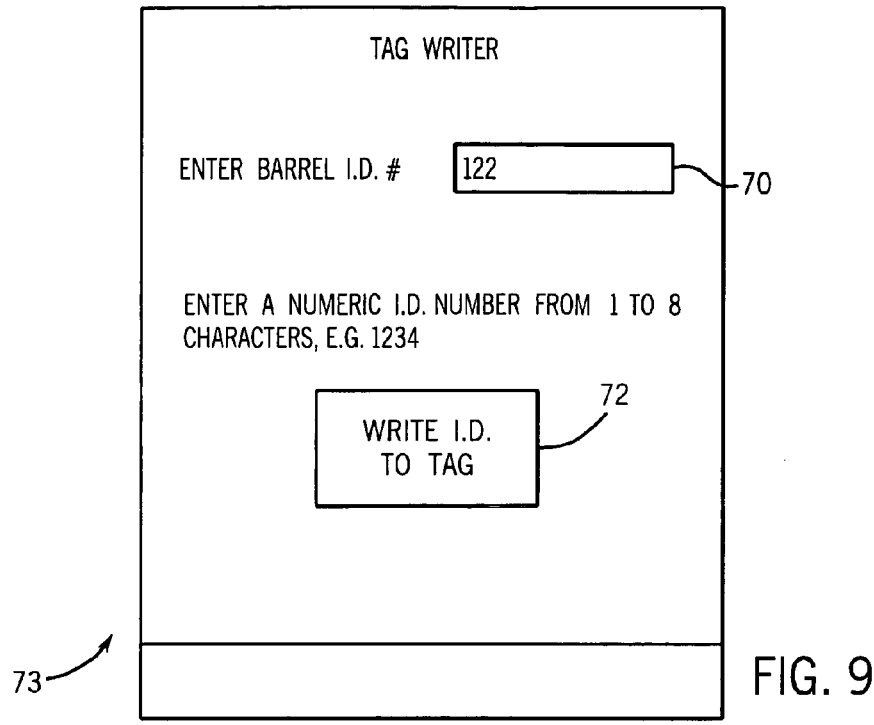
FIG. 9 illustrates a first graphical user interface of embedded software on the hand-held RFID scanner.

Turning to FIG. 9, a graphical user interface (GUI) of embedded software which executes on RFID scanner 16 is shown. The GUI software has particular application to the winemaking industry. However, other embodiments utilize embedded software to realize RFID data tracking in another industry, such as the manufacturing, retail, and service arenas.

The embedded software on RFID scanner 16 has three major functions, with associated screens. These include (1) writing an ID to an RFID tag, (2) displaying, updating, saving, and otherwise managing the winemaking data as it relates to a particular wine barrel, and (3) viewing associated winemaking historical data. RFID scanner 16 also performs additional record keeping functions related to the winemaking industry or another industry, such as testing, processing, and quantitative and qualitative analysis.

Tag writer screen 73 is shown in FIG. 9. Tag writer screen 73 and its associated computer software work to register a particular identification number for a particular barrel. The registration is a first step in initializing the barrel for use in winemaking RFID data tracking system 64.

Barrel I.D. data field 70 is shown with a particular barrel ID, e.g. ID No. 122 has been entered. Adjacent to field 70 is write I.D. button 72. A winemaker uses tag writer screen 73 to first enter a respective I.D. number that will be associated with the wine barrel in data field 70. As a next step, the winemaker presses write I.D. button 72. Barrel I.D. 122 is written to RFID data tag 12 located on the end of wine barrel 68.

The tag writer screen and its associated computer software works to automatically increment respective barrel identification numbers. For example, RFID scanner 16 has the number of the last registered and written I.D. located in memory 32 or its mass storage device 30. The I.D. number is incremented to reflect a new identification number, which is automatically generated in data field 70, with an option by the winemaker to change the I.D. if desired.

Returning to the exemplary RFID tracking transaction A, the winemaker uses tag writer screen 73 in conjunction with the rest of the components of winemaking RFID data tracking system 64 in the following manner. To write data to the RFID tag, the winemaker enters a barrel I.D. number into I.D. data field 70. The winemaker extends shaft 52 to reach barrel 68 located high on wine barrel rack 66. The winemaker holds RFID scanner 16 so that RFID reader 50 comes in close proximity with the appropriate scan area on barrel 68 to communicate with RFID data tag 12. As described previously, the winemaker presses I.D. button 72. The respective I.D. of the barrel which was entered in barrel I.D. data field 70 is written to RFID data tag 12. A confirmation tone sounds indicating that a communication link 14 has been established between RFID scanner 16 and RFID data tag 12, and that the barrel I.D. has been successfully written to RFID data tag 12.

Figure 10:
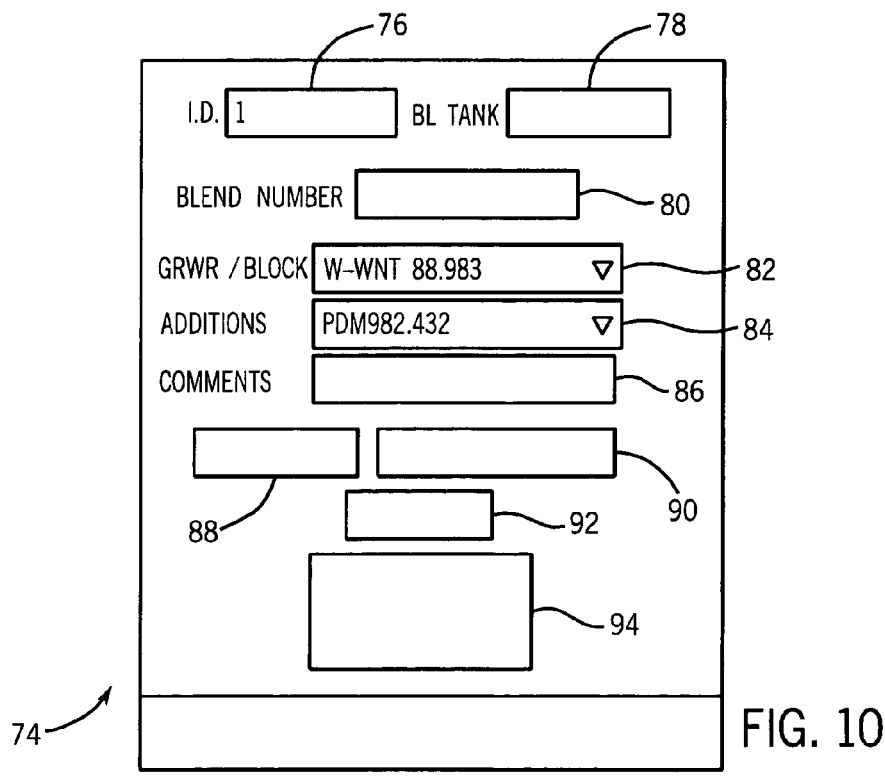
FIG. 10 illustrates a second graphical user interface of embedded software on the hand-held RFID scanner.

Turning to FIG. 10, barrel inquiry screen 74 is depicted as an exemplary GUI screen of embedded software located on RFID scanner 16. I.D. field 76, BL Tank field 78, Blend Number field 80, GRWR/BLOCK field 82, Additions field 84, Comments field 86, and View History button 88, add to transactions button 90, notes button 92 and scan barrel button 94 are shown.

Returning to the exemplary RFID tracking transaction A, the winemaker uses barrel inquiry screen with its associated computer software by first pressing scan barrel button 94. Again, the winemaker extends or retracts extendable shaft 52 to reach the appropriate RFID data tag 12 on wine barrel rack 66. RFID scanner 16 works to activate the respective RFID tag associated with the barrel being scanned. The RFID tag sends associated identification information back to RFID scanner. Again, the confirmation tone is heard upon a successful data transfer.

Based on the received identification information, RFID scanner 16 uses its onboard wireless communications capability to connect with remote computer 20. The computer queries an onboard database for additional winemaking information, or other information that is related to the particular barrel being scanned.

RFID scanner 16 works in conjunction with an external workstation or other computer to query a specialized process control database that is associated with "Winemaker's Database," an industry application with related data fields. Data fields that appear in barrel inquiry screen 74, such as BL Tank field 78, are fields that are associated with the winemaking database system.

Returning to the exemplary RFID tracking transaction A, once the external database on remote computer 20 is queried, additional winemaking information is sent by remote computer 20 to RFID scanner 16. The information fills the respective data fields, such as Blend Number field 80.

GRWR/BLOCK field 82 and Additions field 84 are depicted as drop-down dialog box menus. The information that fills the data fields reflects the history of the aging process in a particular wine barrel. For example, Additions field 84 refers to a number of additives that have been included in the wine over a period of time, such as yeast, enzymes or sulfur additives. Comments field 86 displays additional comments relating to a particular barrel's winemaking process.

View history button 88 opens a new GUI screen and associated dialog box that will be discussed in a later figure. Notes button 92 opens an additional GUI screen that allows the winemaker to enter handwritten notes or other winemaking process information, which can be associated with a particular barrel identification number and saved to a file. The add to transactions button 90 records or saves the updated barrel process information back to remote computer 20. Alternatively, depending on the users selections and configuration of the system, the updated information may be stored back in RFID tag 12, or in local memory of RFID scanner 16.

Returning to the exemplary RFID tracking transaction A, the winemaker views the respective winemaking process information that is returned upon scanning a particular wine barrel. The winemaker adds additional handwritten notes to an information file by pressing Notes button 92, and finishes by pressing a save and exit button to record the additional information to a file.

Allowing the winemaker to enter handwritten notes is analogous in the winemaking industry to a similar process of using handwritten tasting notes which are used by winemakers when sampling wines at the barrel. Using a digitized handwritten notes process, the winemaker can capture flavor and aroma information to assist in further blending and processing.

Figure 11:
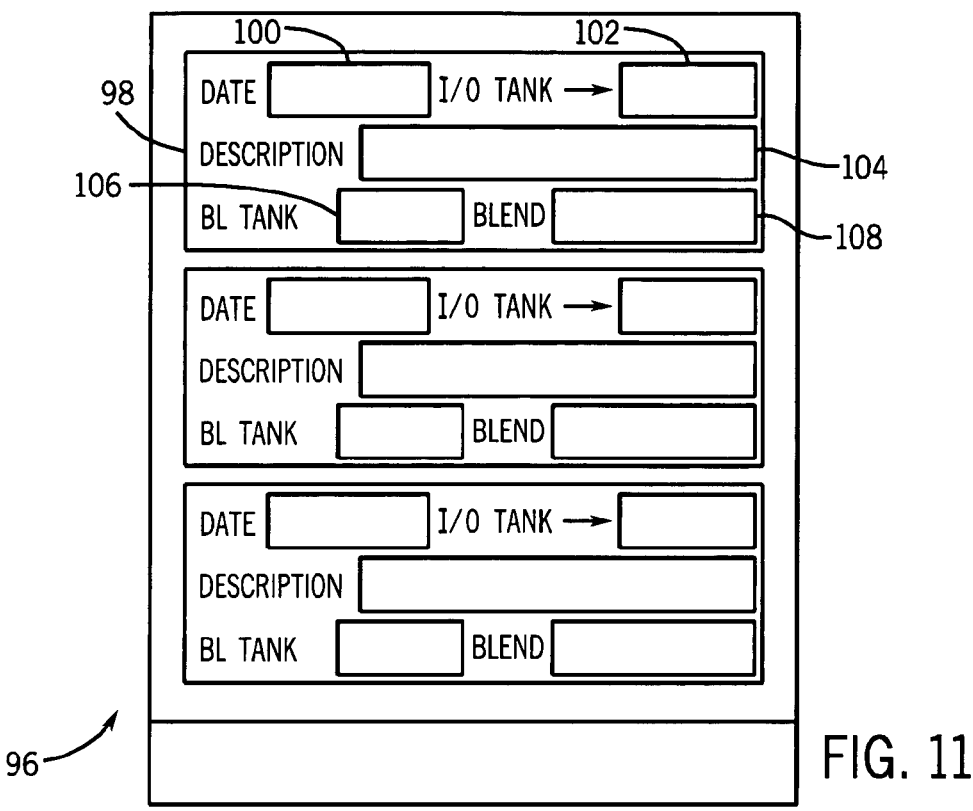
FIG. 11 illustrates a third graphical user interface of embedded software on the hand-held RFID scanner.

Turning to FIG. 11, history screen 96 is depicted as an exemplary GUI screen of embedded software located on RFID scanner 16. History screen 96 appears when the winemaker presses View History button 88. History screen 96 depicts a cluster of three history dialog boxes 98 which include Date field 100, I/O Tank field 102, Description field 98, BL Tank field 106 and Blend field 108. History dialog boxes 98 are arranged in chronological order by date field 100, or can be organized in another arrangement.

Returning to the exemplary RFID tracking transaction A, the winemaker uses history screen 96 to view the respective wine process history of a particular wine barrel. Such information as the date of the respective process, a description of a specific process, tank, blend and other winemaking-specific information is displayed.

Figure 12:
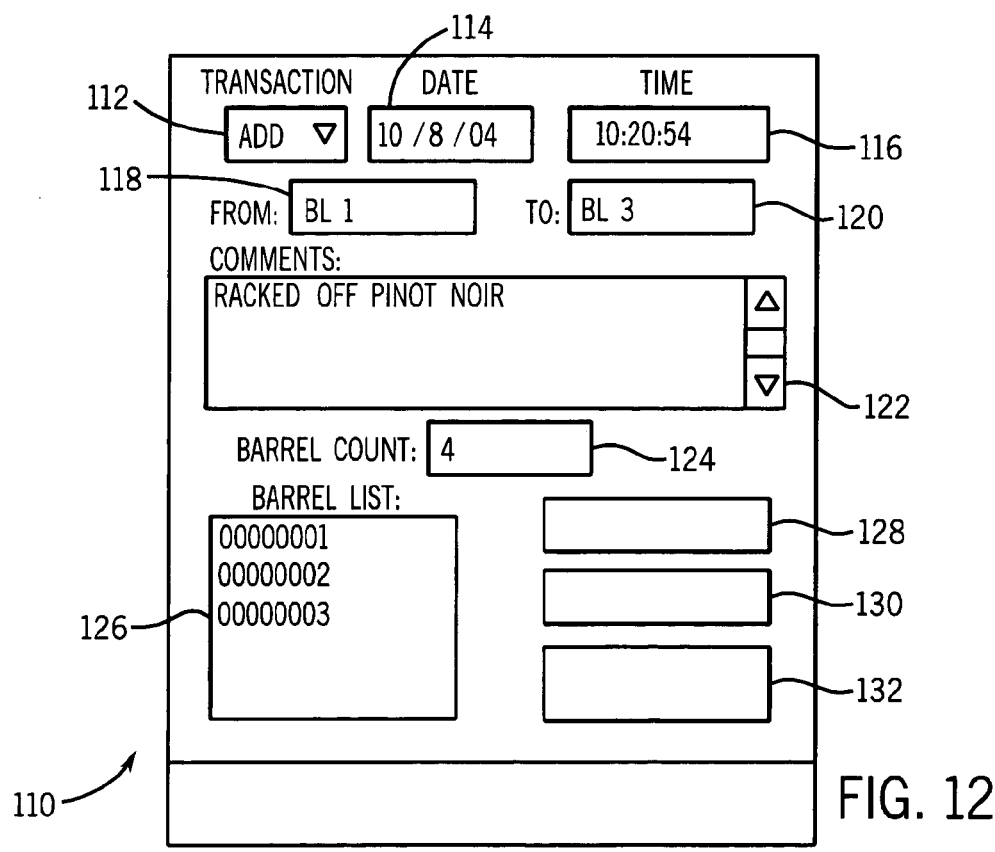
FIG. 12 illustrates a fourth graphical user interface of embedded software on the hand-held RFID scanner.

Turning to FIG. 12, transaction screen 110 is depicted as an exemplary GUI screen of embedded software located on RFID scanner 16. Transaction field 112 is shown as a drop-down menu, which contains a plurality of transaction codes which represent various winemaking processes and are reflected in the winemaker's database system.

Adjacent to transaction field 112 is Date field 114 and Time field 116, which serve to indicate and record respective times and dates of winemaking processes. From field 118 and to field 120 are depicted, which depending on the winemaking process, contain data. Below those fields, comments window 122 is depicted which displays respective comments for that particular winemaking process. Below Comments window 122, Barrel Count fields 124 and Barrel List 126 fields are displayed. Barrel Count field and Barrel List field display the number and relative order of wine barrels involved in a particular transaction.

Remove ID button 128, Remove All button 130, and Send All button 132 operate to remove the wine barrel's identification number, remove all wine barrels in a particular barrel list and send transaction information to an external workstation or other remote computer, respectively.

Returning the exemplary RFID tracking transaction A, the winemaker displays the transactions screen and selects the ADD transaction code and enters respective transaction information, such as the date and time the transaction took place. The winemaker has the option to enter hand-written or typed comments that describe the particular transaction. The winemaker selects and removes a particular wine barrel from the depicted transaction. Finally, the winemaker sends all of the transaction data to remote computer 20 by pressing Send All button 132.

The above screens has described an exemplary process by which the winemaker manages the wine related data on the local controller of RFID scanner 16. In general, at each step in the winemaking process, the user will have a need to record information that has occurred up to that point in the process. The new information may relate to new additives that have been added to the wine barrel, taste testing, chemical analysis, observations from the winemaker, and the like. The RFID scanner allows the user to view the present state of winemaking related information, as retrieved from either RFID tag 12 or from remote computer 20, and then make changes to the winemaking related data in accordance with recently executed steps in the process. The updated information is stored back to the RFID tag or remote computer as per the system configuration.

The ability to retrieve, view, update, and record the winemaking related data is essential to managing the winemaking process. The RFID data tracking system thus provides the feature of storing portions of the winemaking related data in selectable locations, i.e. RFID tag 12, RFID scanner 16, and remote computer 20. The winemaking related data is retrieved from one or more of the selected locations, viewed, updated, and otherwise managed on RFID scanner 16. The updated information is returned to the selected storage locations.

Figure 13A:
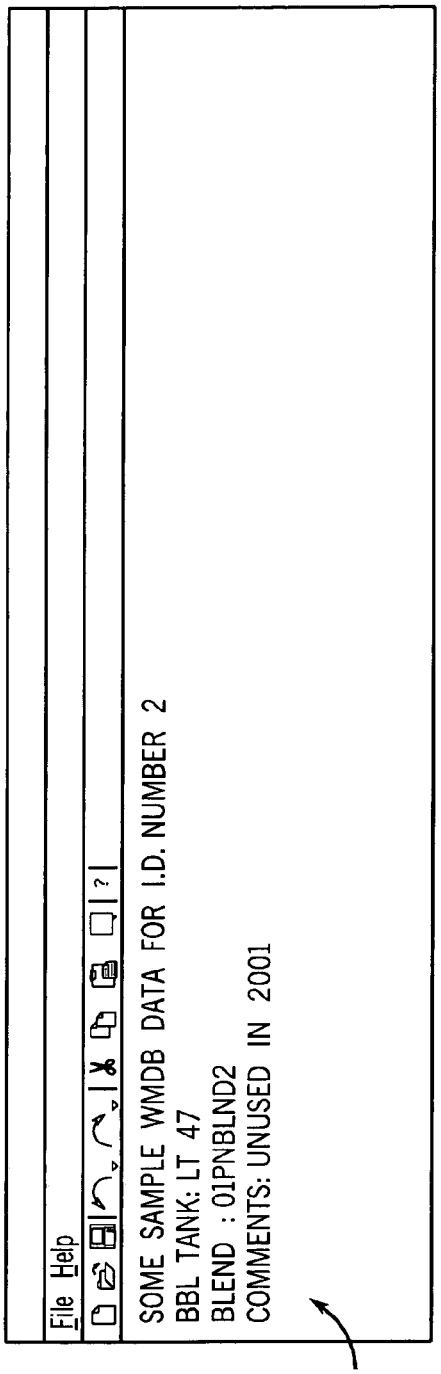
FIG. 13a illustrates a first graphical user interface of embedded software on a remote computer.

Turning now to FIG. 13*a*, data screen 134 is depicted as an exemplary GUI screen of embedded software located on an external workstation or remote computer 20. The depicted screen displays sample winemaking data that has been retrieved from the database located on remote computer 20. In the example, the sample data is associated with the winemaker's database system, and includes such fields as BBL tank, Blend, and Comments.

A database located on remote computer 20 is used by the winemaker or other RFID data tracking user to accomplish such tasks as quality control or inventory process control. For example, the winemaker retrieves information from the database that details the inventory of a particular wine blend in the cellar. An automaker, for example, might use the database to record a history of manufacturing defects associated with a particular car tire. The defect information is retrieved from the database to generate a report or summary.

Figure 13B:
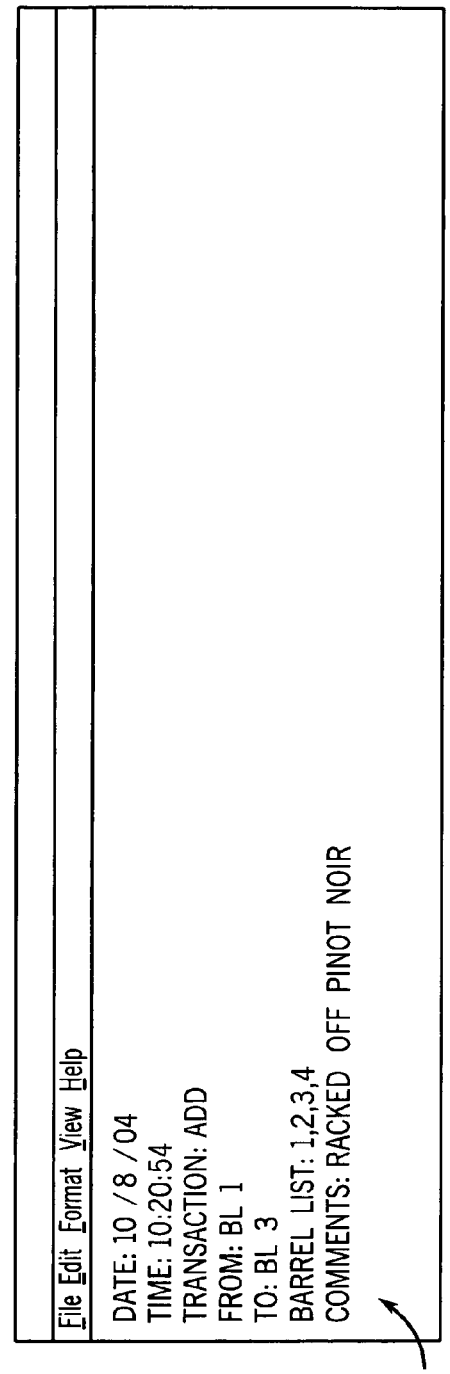
FIG. 13b illustrates a second graphical user interface of embedded software on the remote computer.

Referring to FIG. 13*b*, data screen 136 is depicted as an exemplary GUI screen of embedded software located on an external workstation or computer 20. Referring to the exemplary RFID tracking transaction A, data screen 136 contains winemaking data which has been received from RFID scanner 16 through the ADD transaction as depicted in FIG. 12. Once the winemaker presses Send All button 132, the respective winemaking data is sent via wireless protocol to remote computer 20, where the data is saved to a file or as part of a database. The winemaker views the information through data screen 136 or manipulates the information in another way, such as sending it to another location in the outside world.

Data screens 134 and 136 represent GUIs of forms-based user interface software. Forms-based user interface software is analogous to printed-paper forms used by some winemakers and support staff when logging information about barrel service usage, such as fill history, cleaning history and conditioning history. Additionally, forms-based user interface software is analogous to printed-paper forms used by some winemakers and support staff when logging information about barrel contents, such as grape varietals, source locations, blending profiles, inoculation (i.e., cultures, enzymes, yeasts) and fining.

Figure 14:
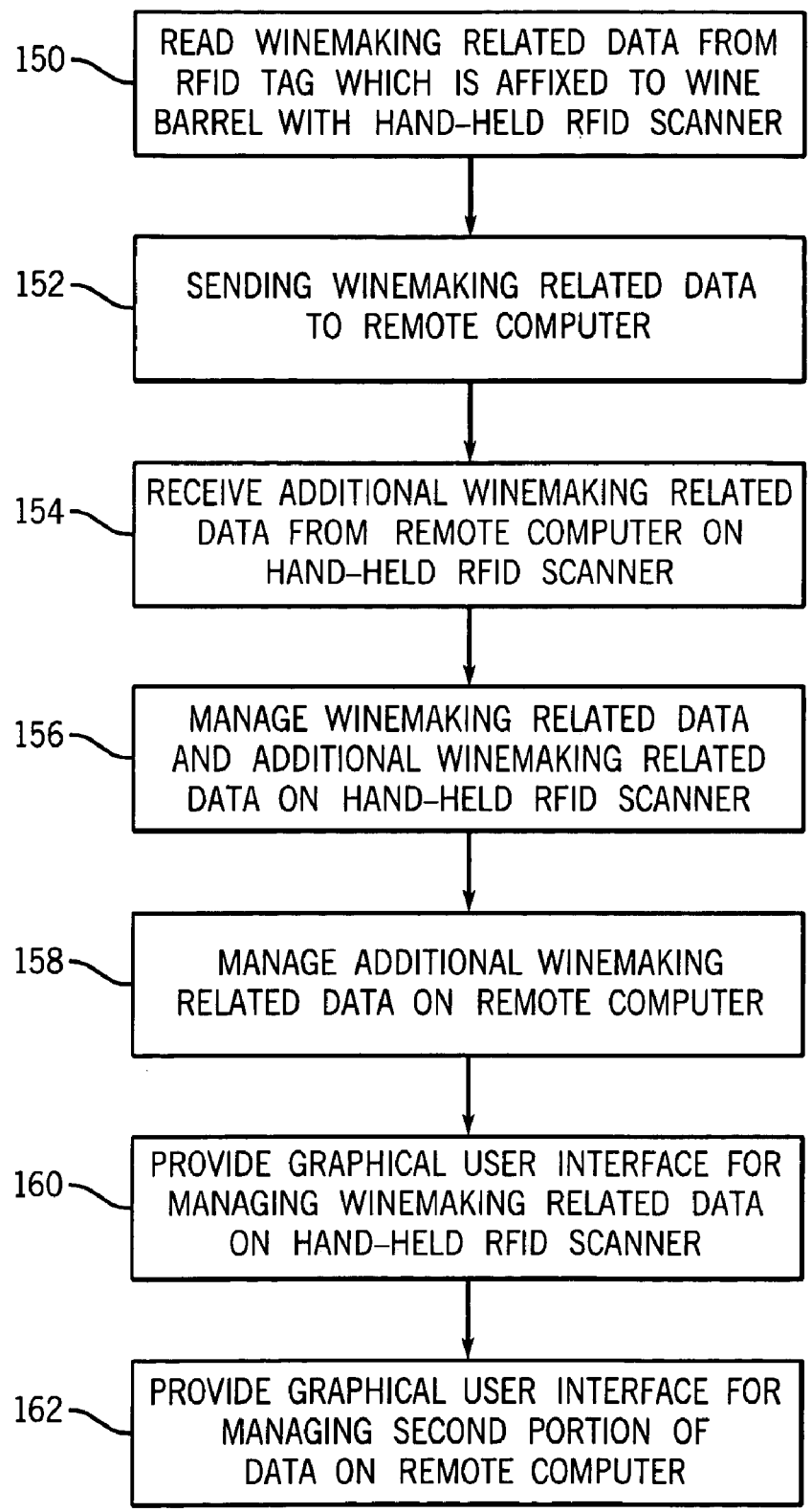
FIG. 14 is a flowchart of the method of data tracking using an RFID system.

The process for radio frequency identification (RFID) data tracking in the winemaking process is shown in FIG. 14. Step 150 reads winemaking related data from an RFID tag which is affixed to a wine barrel with a hand-held RFID scanner. Step 152 sends the winemaking related data to a remote computer. Step 154 receives additional winemaking related data from the remote computer on the hand-held RFID scanner. Step 156 manages the winemaking related data and additional winemaking related data on the hand-held RFID scanner. Step 158 manages the additional winemaking related data on the remote computer. Step 160 provides a graphical user interface for managing the second portion of the data on the remote computer. Step 162 provides a graphical user interface for managing the winemaking related data on the hand-held RFID scanner.

One of the features of RFID data tracking system 10, and more particularly, winemaking RFID data tracking system 64, is the flexibility to customize the data tracking and storage process. RFID tag 12 can be made to have a small or large capacity. In some systems, the data stored with the RFID tag is minimal, e.g. barrel ID number, and the remote computer is the primary data storage medium. The local controller on the RFID scanner is the exchange medium between the RFID tag and the primary data source for information related to the wine barrel. From the above example, the barrel ID is read from the RFID tag and the local controller retrieves the data associated with that barrel from the remote computer. The local controller displays the combination of the data from the RFID tag and the associated data from the remote computer. The data is changed, if needed, and then written back to the remote computer. The RFID scanner becomes the data interface medium between the RFID tag on the barrel and the remote computer.

In other systems, the RFID tag is the primary data depository of all historical events that have occurred, or may need to occur, related to that barrel. In this case, the data tracking system is principally the high capacity memory in the RFID tag and the local controller on the RFID scanner. The local controller is the data management resources using the data stored on the RFID tag. The data is read from the RFID tag, displayed on the local controller, changed if necessary, and then written back to the RFID tag.

In any case, the software executing on the RFID scanner and remote computer allows the system to adapt and expand to encompass many different embodiments of the data tracking system. The software allows the user to decide how the data is managed and where the data is to be retrieved from and stored back to, i.e. whether the data is stored in the RFID tag or the remote computer.

While one or more embodiments of the present invention have been illustrated in detail, the skilled artisan will appreciate that modifications and adaptations to those embodiments may be made without departing from the scope of the present invention as set forth in the following claims.

What is claimed is:

1. A hand-held radio frequency identification (RFID) scanner for tracking data, comprising:
    an extendable shaft having a handle for gripping the hand-held RFID scanner;
    a RFID reader disposed on a first end of the extendable shaft;
    a local controller mounted to the extendable shaft, the local controller receiving data from the RFID reader; and
    an antenna in communication with the local controller for transmitting the data externally.

2. The hand-held RFID scanner of claim 1, wherein the local controller is a personal digital assistant (PDA).

3. The hand-held RFID scanner of claim 1, further including an interface module to electrically connect the RFID reader to the local controller.

4. The hand-held RFID scanner of claim 1, wherein the local controller is mounted to the extendable shaft with a sleeve or slide mount.

5. The hand-held RFID scanner of claim 1, further including a battery for supplying power to the local controller.

6. The hand-held RFID scanner of claim 1, wherein the RFID reader includes an antenna adapted for communicating with an RFID tag.

7. The hand-held RFID scanner of claim 1, wherein the extendable shaft includes a plurality of telescoping segments.

8. The hand-held RFID scanner of claim 1, wherein the extendable shaft includes an electrical mechanism to extend the RFID reader.

9. A radio frequency identification (RFID) scanner, comprising:
    a shaft for providing structural support;
    an RFID reader disposed on the shaft; and
    a local controller mechanically mounted to the shaft and electrically coupled to the RFID reader.

10. The RFID scanner of claim 9, further including an antenna in communication with the local controller for transmitting data to an external system.

11. The RFID scanner of claim 9, wherein the local controller is a personal digital assistant (PDA).

12. The RFID scanner of claim 9, further including an interface module electrically coupled between the RFID reader and the local controller.

13. The RFID scanner of claim 9, further including an RFID tag adapted for communicating with the RFID reader.

14. The RFID scanner of claim 13, wherein the RFID reader includes an antenna for communicating with the RFID tag.

15. The RFID scanner of claim 9, wherein the shaft includes a plurality of telescoping segments.

* * * * *